(12) United States Patent
Erlandson et al.

(10) Patent No.: US 7,830,946 B2
(45) Date of Patent: Nov. 9, 2010

(54) GRATING ENHANCED SOLID-STATE LASER AMPLIFIERS

(75) Inventors: Alvin C. Erlandson, Livermore, CA (US); Jerald A. Britten, Clayton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 300 days.

(21) Appl. No.: 11/394,957

(22) Filed: Mar. 29, 2006

(65) Prior Publication Data

US 2007/0230534 A1    Oct. 4, 2007

(51) Int. Cl.
*H01S 3/08* (2006.01)

(52) U.S. Cl. ............... 372/102; 372/68; 372/70; 359/337.21; 359/345

(58) Field of Classification Search ............. 372/68, 372/70, 102; 359/337.21, 345
See application file for complete search history.

(56) References Cited

U.S. PATENT DOCUMENTS

| | | | | |
|---|---|---|---|---|
| 3,970,959 A | * | 7/1976 | Wang et al. ............ | 372/96 |
| 5,335,237 A | * | 8/1994 | Zapata .................. | 372/33 |
| 5,337,328 A | * | 8/1994 | Lang et al. ............ | 372/45.01 |
| 5,754,572 A | * | 5/1998 | Pinto et al. ............ | 372/20 |
| 5,907,436 A | * | 5/1999 | Perry et al. ........... | 359/576 |
| 6,122,299 A | | 9/2000 | DeMars et al. | |
| 6,501,592 B2 | | 12/2002 | Terahara | |
| 6,559,946 B2 | | 5/2003 | Davidson et al. | |
| 6,788,726 B2 | | 9/2004 | Zhang et al. | |
| 6,834,067 B2 | * | 12/2004 | Peressini ............... | 372/49.01 |
| 7,254,152 B2 | * | 8/2007 | Sumida et al. ......... | 372/68 |
| 2002/0106156 A1 | | 8/2002 | Vail et al. | |
| 2003/0031226 A1 | * | 2/2003 | Byren et al. ........... | 372/66 |
| 2006/0082867 A1 | * | 4/2006 | Starodoumov et al. ... | 359/337 |

* cited by examiner

*Primary Examiner*—Minsun Harvey
*Assistant Examiner*—Joshua King
(74) *Attorney, Agent, or Firm*—John H. Lee; James S. Tak

(57) ABSTRACT

A novel method and apparatus for suppressing ASE and parasitic oscillation modes in a high average power laser is introduced. Such an invention, as disclosed herein, uses diffraction gratings to increase gain, stored energy density, and pumping efficiency of solid-state laser gain media, such as, but not limited to rods, disks and slabs. By coupling predetermined gratings to solid-state gain media, such as crystal or ceramic laser gain media, ASE and parasitic oscillation modes can be effectively suppressed.

34 Claims, 6 Drawing Sheets

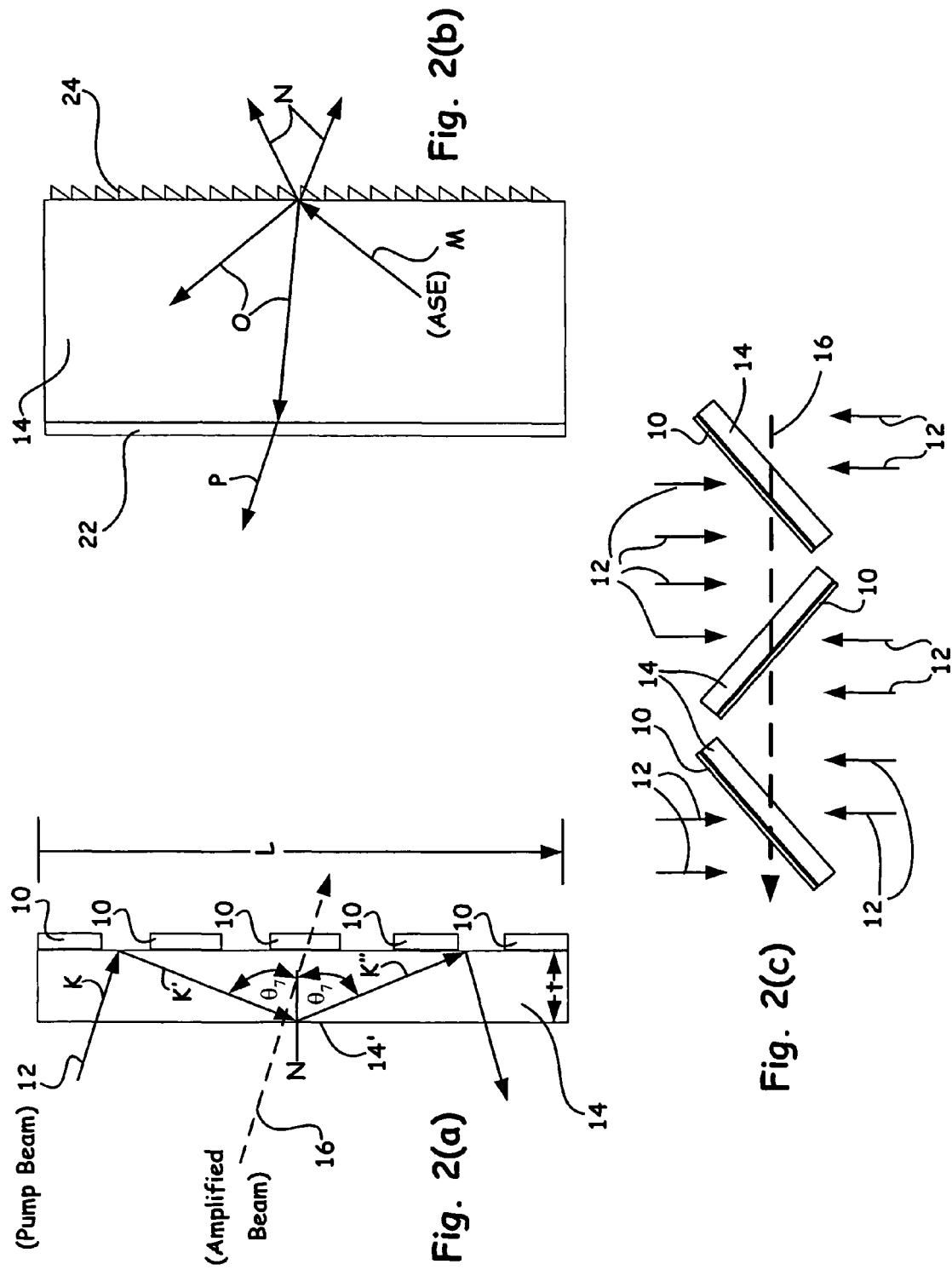

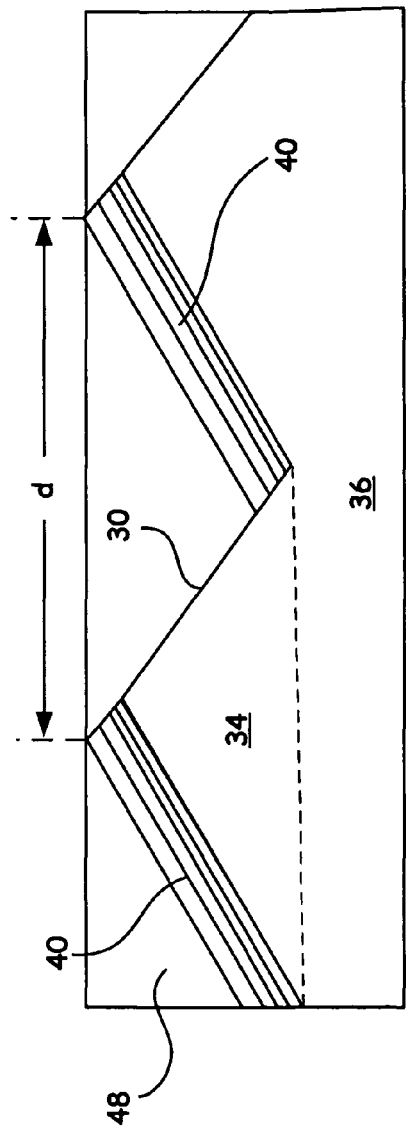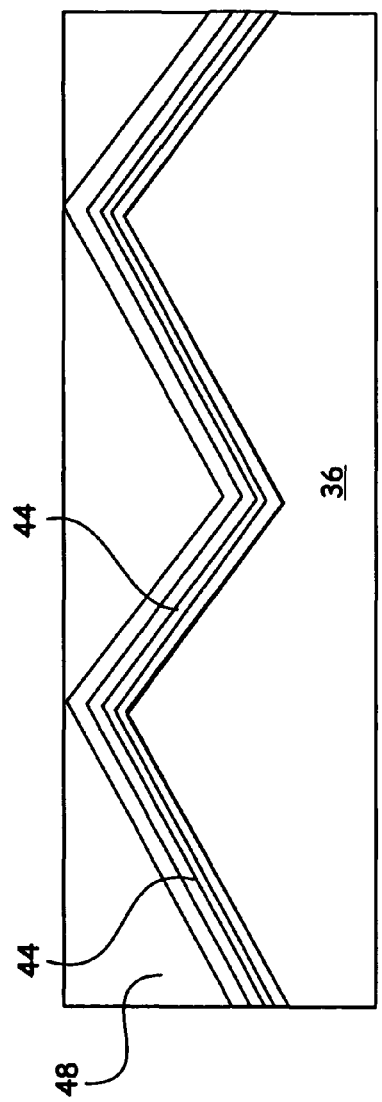
Fig. 3(a)
Fig. 3(b)

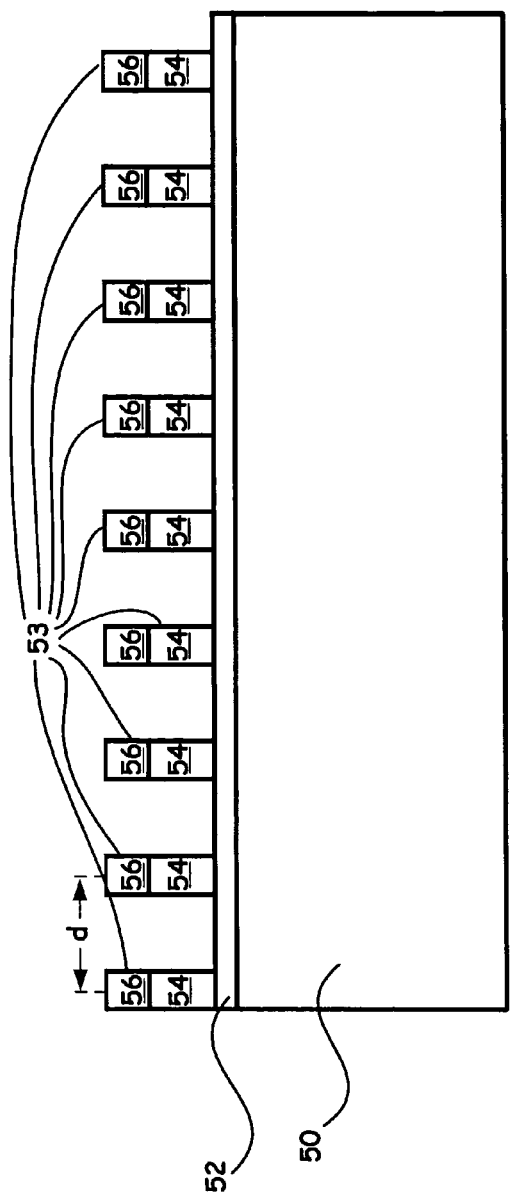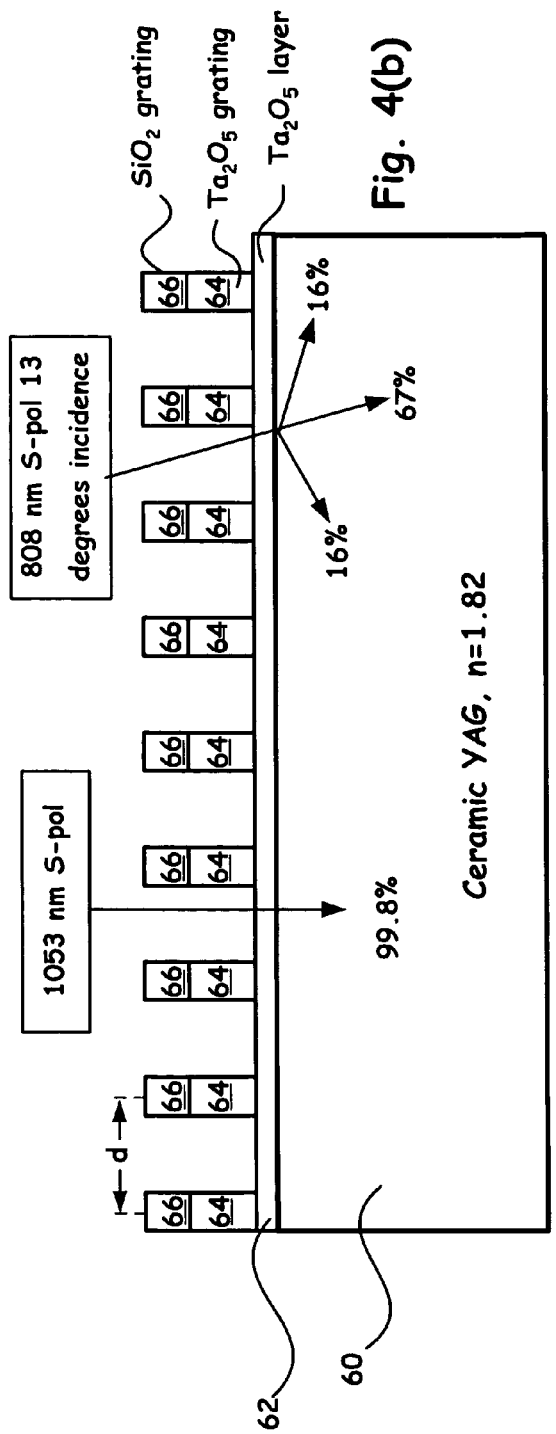

US 7,830,946 B2

GRATING ENHANCED SOLID-STATE LASER AMPLIFIERS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to optically pumped solid-state laser amplifiers. More specifically, the present invention relates to a grating method and apparatus embodiment for reducing or eliminating parasitic oscillations (e.g., amplified spontaneous emission (ASE)) in solid state laser materials.

2. Description of Related Art

Amplified Spontaneous Emission (ASE) strongly impacts performance and efficiency of high-power laser systems. ASE is produced when excited ions in the laser gain medium spontaneously emit light that is amplified by other excited ions. ASE increases the overall decay rate of excited ions and thereby decreases gain and stored energy that is available for amplifying the laser beam. ASE is emitted at all angles within the volume of the gain medium. Most of it is trapped by total internal reflection (TIR), and bounces back and forth between the faces of the gain medium before reaching the periphery. Background information on such deleterious ASE and parasitic oscillation effects can be found in "Fluorescence Amplification and Parasitic Oscillation Limitations in Disk Lasers", by J. B. Trenholme, NRL Memorandum Rep. 2480, July, 1972; J. E. Swain, et al., J. Appl. Phys., 40, p. 3973 (1969); and J. M. McMahon et al., IEEE J. Quantum Electron. QE-9, p. 992 (1973)).

Much development has gone into methods and materials that are applied to the periphery of the gain medium to out-couple light that reaches this edge (i.e. edge cladding background). However, new solutions are required to allow out-coupling of this light at the faces of the gain media, before it reaches the periphery, in order to allow for optimum energy extraction, larger gain media apertures, and fewer overall gain media for a given energy requirement. In LLNL's NIF laser for example, modeling shows that gain coefficients and stored energy density would be ~44% greater without ASE. If ASE could be defeated, corresponding fewer laser slabs would be needed to provide the necessary gain, resulting in significant cost savings. Further, the resulting higher gain per slab would enable beamlines to operate at higher intensities without exceeding non-linear phase shift limits.

Another problem concerning slab-geometry laser gain media is the need for higher coupling efficiency of diode pump light into them. For many solid-state lasers, the amplifying slabs or disks absorb only a fraction of the incident pump light due to the limited path length of pump light through the slabs.

In principle, pump-light absorption can be increased by increasing the density of absorbing ions or by increasing the thickness of the laser medium. However, ion density is often limited by material fabrication issues or other factors, such as "concentration quenching" that occurs with $Nd^{3+}$ ions. Slab thickness is often limited by thermal issues. These limitations can put undesirable constraints on slab and amplifier design and performance.

SUMMARY OF THE INVENTION

Accordingly, the present invention provides a method for suppressing ASE in a high average power solid-state laser, that includes providing one or more laser gain media and integrating one or more non-planar profiles with the one or more of the laser gain media so as to efficiently extract a desired spectral range, efficiently couple a predetermined optical pump source and out-couple amplified spontaneous emission (ASE) for each said laser gain media.

Another aspect of the present invention is directed to an apparatus having gain media configured with one or more non-planar profiles for suppressing ASE while efficiently coupling pump light and transmitting a desired extraction beam.

Suppression of gain clamping resulting from amplified spontaneous emission (ASE) has enormous potential benefits to large-aperture solid-state laser systems (e.g., systems of up to about 100 kW) by allowing more efficient coupling of pump light to the amplified light. Accordingly, fewer and thinner gain media slabs required for the same gain with a lower B-integral and larger apertures that are now fundamentally limited by ASE now become possible, which also allows for larger aperture slabs.

BRIEF DESCRIPTION OF THE DRAWINGS

The accompanying drawings, which are incorporated into and form a part of the disclosure, illustrate an embodiment of the invention and, together with the description, serve to explain the principles of the invention.

FIG. 2(a) illustrates a basic example embodiment of a grating integrated to a laser gain media.

FIG. 2(b) illustrates the coupling of ASE out of a laser slab by either direct transmission or by reflecting light back through the slab at an angle smaller than the TIR angle.

FIG. 3(a) shows example methods of producing gratings of the present invention.

FIG. 3(b) shows example methods of producing gratings of the present invention.

FIG. 4(a) illustrates a multilayer dielectric structure for out-coupling ASE radiation of a laser gain media while providing high-efficiency transmission of the pump and extraction beams.

FIG. 4(b) illustrates an optimized design of FIG. 4(a).

DETAILED DESCRIPTION OF THE INVENTION

General Description

Optical Gratings

The basic geometric properties of any optical grating follow from the grating equation (Equation 1) that expresses the condition for constructive interference from successive periodic elements on a surface and that relates the incidence angle $\theta_i$, the diffracted angle $\theta_m$ for order m, and the ratio of the wavelength $\lambda$ to groove spacing d:

$$\sin\theta_m = \sin\theta_i + m\lambda/d. \quad (1)$$

For a reflection grating used in a first-order Littrow mount (m=−1), the angle of incidence is fixed by the condition $\sin\theta_i = \lambda/2d$. Only specular reflection (m=0) and evanescent orders occur when $\lambda/d>2$, whereas, for the range $2>\lambda/d>2/3$, two propagating orders occur (m=0 and retro-diffraction m=−1).

As opposed to mirrors or flat reflective surfaces wherein only the index of refraction and absorption of the layer(s) determine the reflectivity, the efficiency (i.e., the distribution of energy among the various orders) of a grating additionally depends upon the wavelength and the polarization of incident light, the characteristics of the grating profile, details of the deposition method, and amount of material to be deposited.

ASE and Parasitic Oscillations

During optical pumping, some of the excited dopant atoms spontaneously decay, emitting photons at the frequency of a designed laser transition. Such photons can be emitted at all angles. Many of these rays are emitted at angles greater than or equal to the critical angle for total internal reflection (TIR) so as to be trapped between a gain media's disk faces and amplified (i.e., ASE) as they travel through the laser gain media. In high average power disk amplifiers in particular, ASE emitted beyond the TIR angle is totally reflected back into the disk. If the gain in traversing the disk exceeds the edge losses then the process can proceed indefinitely. This effect is referred to as a parasitic oscillation. Importantly, such effects become more likely to occur as the aperture is increased.

In order to operate efficiently, a laser apparatus/system must have a certain minimum product of the gain coefficient $g_o$ [1/cm] and the length over which that gain is experienced L [cm], leading to a fundamental laser figure of merit, the dimensionless product $g_o L$. One typically tries to achieve a $g_o L$ of over 2 in the beam direction in order to get efficient lasing operation. ASE photons undergoing amplification robs some of the stored lasing energy in the beam direction, and thus creates a deleterious effect with respect to the output power and is a serious concern in all large aperture lasers. Since the gain coefficient is given by the strength of the pumping, a laser gain disk or slab which is too large has more ASE losses than one which has the same gain coefficient $g_o$, but is smaller in the dimension L.

Figure 1:
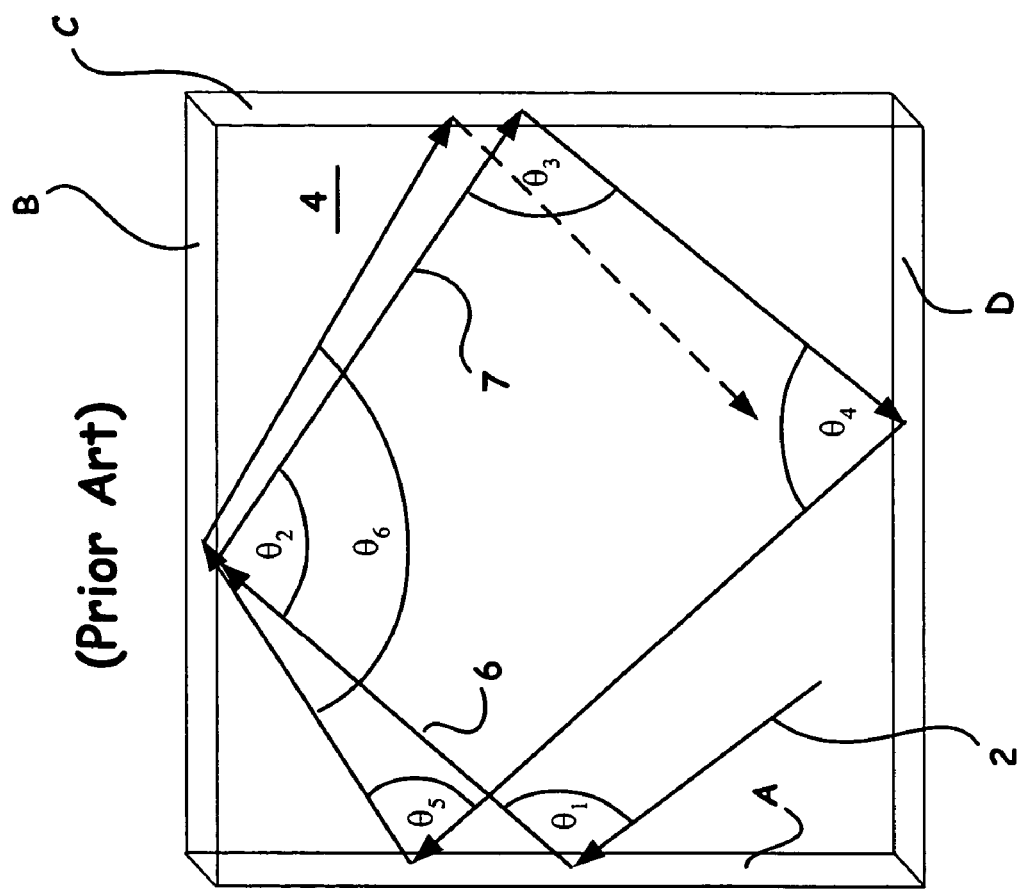
FIG. 1 illustrates ASE resulting from laser gain disk pumping.

FIG. 1 illustrates ASE and a parasitic oscillation mode produced in a conventional slab 4. As shown in FIG. 1, upon ASE, an emitted photon can travel along a direction, as shown by a ray 2, and can strike a smooth peripheral edge or face surface (denoted by the letter A) at an angle $\theta_1$ greater than a critical angle so as to be totally internally reflected (as shown by a reflected ray 6). Ray 6 is subsequently incident on an adjacent peripheral side surface (denoted as B) at an incident angle $\theta_2$ greater than the critical angle and again internally reflected, as shown by a second reflected ray 7. Such reflected ray paths can proceed to adjacent side surfaces (i.e., peripheral edge surfaces C and D) and back to surfaces A and B of slab 4 again at angles (e.g., $\theta_3$, $\theta_4$, $\theta_5$, and $\theta_6$, etc.) greater than the critical angle and can thus be totally internally reflected a number of times so as to be trapped inside slab 4. As discussed above, if incident ray 2 and subsequent reflected rays, e.g., 6 and 7, can achieve a gain exceeding the edge reflection losses then such a resultant path can lead to a parasitic oscillation.

Laser glass slabs configured for the national ignition facility (NIF) at Lawrence Livermore Laboratories (LLNL), for example, traps about 75% of the isotropically emitted ASE by total internal reflections. The average gain coefficient and available stored energy for NIF slabs are about 44% greater without ASE. ASE also causes a 2:1 center-to-edge gain rolloff in the main amplifier system. The situation is even worse with gain media having higher refractive indices, such as crystals and ceramic slabs. With the recent advent of large-aperture ceramic slabs as a gain medium, the limit on aperture size for high-energy, high average-power lasers is now defined by gain clamping of ASE, not the availability of large slabs.

Accordingly, the present invention addresses two problems that impact the design and performance of solid-state commercial and industrial lasers, such as the NIF facility at LLNL. The first problem is the need for higher coupling efficiency of diode pump light into solid-state laser gain media. For many solid-state lasers, the amplifying slabs (or disks or rods) absorb only a fraction of the incident pump light. In principle, pump-light absorption efficiency can be increased by increasing the density of absorbing ions or by increasing the thickness of the laser medium. However, ion density is often limited by material fabrication issues or by other factors, such as interactions between ions that can reduce gain and stored energy (e.g., the "concentration quenching" that occurs with $Nd^{3+}$ ions). In many applications, thickness is limited by the need to achieve adequate cooling rates so that the laser can be fired at a specified repetition rate. A solution used in the Mercury laser at LLNL is to stack relatively thin laser slabs one closely behind another, so that pump light from diodes passes through up to seven laser slabs. While this solution works for Mercury, it has put stringent demands on conditioning of the diode pump light to ensure uniform and efficient pumping, for which a large reflecting duct has proven necessary.

The second problem addressed by the present invention is ASE, which strongly impacts performance and efficiency of high-power solid-state lasers. ASE, as discussed in some detail above, increases the overall decay rate of excited ions and thereby decreases gain and stored energy available for amplifying the laser beam. In the NIF laser, modeling shows that gain coefficients and stored energy density are about 44% greater without ASE. Therefore, suppression of ASE results in fewer expensive slabs to meet energy specifications. Secondary problems caused by low pump-light coupling efficiency and by ASE are relatively low gain coefficients and stored energy density in gain media. In turn, such problems cause larger accumulated non-linear phase shifts (known as "delta-B" and "sigma-B") that degrade the laser beam and which are mitigated by the use of long spatial filters, which partially restore beam quality. These long spatial filters increase space requirements and cost of high-power laser systems.

Currently, the most effective method of limiting ASE effects in laser slabs and disks is by limiting their size as suggested to above. As a rule of thumb, the product of the average gain coefficient multiplied by the longest dimension of a laser slab or disk is beneficially less than about 4.5. This limit on slab or disk size limits the size of the laser beam, and in turn the energy that can be produced per beam. The limit on beam energy renders some laser applications impossible or impractical. For other applications, many more laser beams need to be used to meet an energy requirement, with resulting increase in cost.

The present invention is directed to solving the problems, as described above, by for example, cutting, milling, etching or depositing (e.g., depositing one or more dielectric layers) a periodic structure on one or more surfaces (e.g., the faces or peripheral edges) of a laser gain media (laser slab or disk or rod) arranged in predetermined amplifier geometries (e.g., zig zag, Brewster configurations etc.).

Such arrangements prevent some fraction of the ASE emitted at large angles to be trapped by total internal reflection (TIR). Just as importantly, such grating structures, as disclosed herein, are also designed to transmit the amplified beam while coupling the predetermined pump wavelength with high efficiency with a benefit of withstanding high peak and average power with no absorption of the laser or pump light. Furthermore, the configured structures of the present invention are manufacturable using existing materials and processing technologies as known to those of ordinary skill in the art.

Specific Description

The present invention thus utilizes gratings (in one-dimensional or two-dimensional (e.g., a cross-grating) configurations) in integrated arrangements with laser gain media as a beneficial means to suppress ASE, efficiently couple pump light, while transmitting a predetermined amplified beam in a high average power laser apparatus/system(s). Such beneficial laser gain media capable of being configured with such gratings of the present invention include, but are not limited to, neodymium gadolinium gallium garnet (Nd:GGG or "GGG" for short), neodymium doped yttrium aluminum Garnet (Nd:YAG), ytterbium doped yttrium aluminum garnet (Yb:YAG), Ti:Sapphire (Ti:Al$_2$O$_3$), ruby (Cr$_2$O$_3$), alexandrite (BeAl$_2$O$_4$:Cr$^{3+}$), ceramics (e.g., ceramic Nd:YAG), ytterbium-doped strontium-fluorapatite (Yb:S-FAP), Neodymium Doped Yttrium Orthvanadate (Nd:YVO$_4$), and Erbium doped Yttrium Lithium Fluoride (Er:YLF), etc., or any laser gain media capable of operating within the spirit and scope of the present invention.

In addition, laser gain media configured, for example, as a disk or slab, can each have a thickness ranging approximately from about 1 mm to about 40 mm with transverse dimensions ranging from about 10 mm×10 mm to about 400 mm×400 mm. Moreover, the disks or slabs, can be cut into any shape, such as, but not limited to, rectangles or polygonal shapes, squares, ellipses, etc.

Turning back to the drawings, FIG. 2(a) illustrates a basic example embodiment, wherein a grating 10 of the present invention can improve coupling of a pump beam 12 into a laser slab 14, by diffracting pump beam 12 back through slab 14 at large angles to increase the absorption path length while transmitting an a desired amplified beam 16 (shown as a dashed line) with greater than about 90% efficiency, often greater than about 97% efficiency. As shown in FIG. 2(a), pump beam 12 passes once through the slab (denoted by the letter K), is diffracted by grating 10, and passes a second time through the slab (denoted by the letter K'), this time with a direction vector that has a large angle (shown with double arrows and denoted as θ$_7$) with respect to the surface normal (denoted by the letter N). The path length for this second transit across the slab is much longer than slab 14 thickness (shown with double arrows and denoted by the letter t). After pump beam 12 (denoted by the letter K') is reflected at the slab surface (denoted by 14') opposite grating 10, the beam passes a third time (denoted by the letter K") through the slab, also while traveling at a steep angle (shown with double arrows and denoted as θ$_7$) through a long path. By using grating 10, the overall absorption path length of the pump beam can be many times its value for single-pass pumping.

The grating designs of the present invention enable the width of the diffracted beam width to be smaller than the incident beam, leading to the overlap of reflected and incident pump beams, which beneficially increases the intensity of pump light inside the slab by many times its value for the incident pump beam. Such a pump-light intensification has significant potential for enhancing the performance of quasi-three-level lasers, such as the holmium laser, which requires bleaching of the ground state for efficient operation. Holmium lasers operate at eye-safe wavelengths and are useful for many applications. Currently, however, holmium lasers must be cryogenically cooled for efficient operation. With the present invention, cooling requirements are relaxed or perhaps eliminated.

Many variant embodiments are possible for the grating applications as disclosed herein. For example, gratings might be placed on both sides of the laser slab, with pump light incident on both sides. Gratings might also be used in transmission rather than in reflection, so that the pump beam is diffracted at a large angle just as it enters the slab. Gratings can also be used in other geometries, such as laser disks and rods. As another beneficial embodiment, a grating 10, as shown in FIG. 2(a), of the present invention can be integrated to a peripheral edge (e.g., peripheral edge C as shown in FIG. 1) of an amplifier so as to suppress ASE traveling along the length (denoted by the letter L, as shown in FIG. 2(a)) and within an angular acceptance cone. Such ASE can be coupled out of a predetermined peripheral edge of an amplifier having a designed grating of the present invention and absorbed by a material decoupled from the amplifier edge. By way of example, when attempting to suppress 1.06 micron ASE, a media doped with, for example, metal ions such as cobalt, e.g., Co:GGG, Co:YAG, can be utilized to absorb predetermined wavelengths away from the peripheral edges of the laser gain media so as to meet the specifications of the present invention. As another beneficial absorbing media arrangement, the present invention can also include a metal absorber often having a coating (e.g., a blackened anodized coating) to absorb ASE. It is to be appreciated that temperature induced stress distributions in the laser amplifier disks can cause depolarization of the transmitted laser beam and in turn cause reflective losses at the surfaces of the laser gain media, such as in Brewster oriented configurations. However, such decoupled absorbers, designed for predetermined ASE lasing transitions, is enabled by the grating embodiments disclosed herein so as to minimize heat induced stress effects typically induced by ASE edge cladding absorbers.

FIG. 2(b) illustrates another example embodiment of how a grating as disclosed herein can be used to couple ASE out of a laser slab by either direct transmission or by reflecting light back through the slab at an angle smaller than the TIR angle. By depositing a grating via, for example, by dielectric coating methods or by imbedding, e.g., by etching a predetermined groove pattern just below the surface, on or into the gain material and designed with transmission orders at angles smaller than the TIR angle, such predetermined orders can be substantially transmitted at a laser gain media slab surface. Since most ASE rays encounter slab surfaces many times before attaining harmful fluence levels, transmission and reflectance losses at each encounter with the grating need not be near unity for significant reduction in ASE to occur. Accordingly, a grating 24, as shown in FIG. 2(b), of the present invention can be designed to couple ASE (denoted as ray M and generated in 2π within the media) out of a laser gain media (e.g., a slab 14) through direct transmission through the slab (shown by rays N), and by reflecting rays (denoted as rays O) within the TIR cone to the opposite side and out (denoted as ray P). This has significant implications for the feasibility of making effective ASE-suppressing gratings. To out-couple ASE rays that have large out-of-plane angles for the first grating, a second grating (not shown) with grooves oriented perpendicular to can be beneficially added on the opposite side of slab 14. Three-dimensional gratings, imbedded in the laser gain medium itself or in layer(s) (dielectric multi-layers further detailed infra) attached to the gain medium, might also be used to improve coupling of pump-laser light into slabs, or ASE light out of slabs.

FIG. 2(*c*) illustrates an example system application of the present invention similar to the NIF architecture at Lawrence Livermore Laboratories. Such an example arrangement illustrates the capability of double-sided diode pumping 12 (shown as solid arrows) of one or more amplifiers 14 configured in a Brewster arrangement and having integrated gratings 10 to enable suppression of ASE, efficient coupling of the pump light 12 while extracting a desired amplified beam 16 (shown as a dashed arrow) directed along a predetermined path (e.g., a zig-zag arrangement or a direct path as shown in FIG. 2(*c*)). Such gratings 10, operating in a transmission arrangement or in a reflection arrangement, as shown in FIG. 2(*c*), increases the path length of the pump light (as illustrated in FIG. 2(*a*)) and enables double sided pumping even with a single grating.

As another beneficial arrangement, an anti-reflection coating (e.g., 22, as shown in FIG. 2(*b*)) such as, but not limited to, a multi-layer dielectric or a single layer sol-gel, (see Steiner, et al., U.S. Patent No. 2001/0024684 A1, titled "Process For Producing Antireflection Coatings," and Witzman, et al., U.S. Patent No. 2001/0005553 A1, titled "Linear Aperture Deposition Apparatus And Coating Process"), can be coated on the surfaces of such predetermined laser gain slabs or disks or grating structures specifically for a predetermined gain wavelength, for example 1061 nm, so as to increase laser efficiency and in some arrangements, for protection of integrated grating structures.

FIGS. 3(*a*) and 3(*b*) shows example illustrations of producing gratings of the present invention. As shown in FIG. 3(*a*), predetermined grooves 30, having sinusoidal, triangular and/or rectangular profiles and having a period (d) less than about one half the wavelength ($\lambda/2$) of a desired extraction beam to be amplified, are cut, etched, milled or deposited, often by dielectric deposition methods (e.g., 34 as shown in the dashed region), onto a laser gain media 36 to make a non-planar surface so as to produce a transmission or reflection a grating. Once such a structure is produced, an anti-reflection coating, such as gold (Au) or more often, a multilayer dielectric coating 40 of alternating layers of high and low index dielectric materials (e.g., $HfO_2$, $SiO_2$, $Ta_2O_{4-5}$, $Sc_2$, $O_3$, $ZrO_2$, $TiO_2$, $Al_2O_3$, $MgF_2$, $CaF_2$, $ThF_4$, ZnS, ZnSe, etc.) can be deposited on a single side of said grooves 30, as shown in FIG. 3(*a*) or such a multilayer dielectric coating can be deposited on both sides 44, as shown in FIG. 3(*b*), to decrease the fresnel reflection losses. As a further implementation of the present invention, a dielectric overcoat 48, such as $SiO_2$, of a predetermined thickness, can be applied to the coatings 40 of FIG. 3(*a*) or 44 of FIG. 3(*b*), and or bare grooves 30 to increase the hardiness of the arrangement to environmental conditions.

As an even more beneficial example embodiment, such gratings can be fabricated entirely by controlled deposition techniques as detailed in U.S. Pat. No. 5,907,436, titled, "Multilayer dielectric Diffraction Gratings," issued May 25, 1999 to Perry et al, assigned to the instant assignee and incorporated by reference in its entirety. The multilayer stack is designed for use with the top grating layer and is produced on a predetermined surface of a laser gain media by any conventional coating method including, but not limited to: electron beam evaporation, chemical vapor deposition, and molecular beam epitaxy.

Subsequently, a free standing deposition mask is then produced and placed above the multilayer dielectric stack and a grating is formed by directional evaporation of the dielectric grating material through the mask. The open regions of the mask allow dielectric material to flow through the mask and deposit on top of the multilayer stack and the closed regions of the mask block the deposition. The mask is then removed by chemical, plasma or physical means leaving a completed grating on a predetermined laser gain media substrate. The result is a multilayer dielectric grating where the groove structure is in the top layer. Such dielectric multilayer gratings are generally a multilayer oxide stack which often include alternating layers of high and low index dielectric materials (e.g., $HfO_2$, $SiO_2$, $Ta_2O_{4-5}$, $Sc_2O_3$, $ZrO_2$, $TiO_2$, $Al_2O_3$, $MgF_2$, $CaF_2$, $ThF_4$, ZnS, ZnSe, etc.) which exhibit low absorption at a desired transition wavelength. By adjusting the design of the dielectric multilayer coating and/or the grating layer, the distribution of energy between the reflected, transmitted and diffracted beams can be arbitrarily controlled.

Figure 4C:
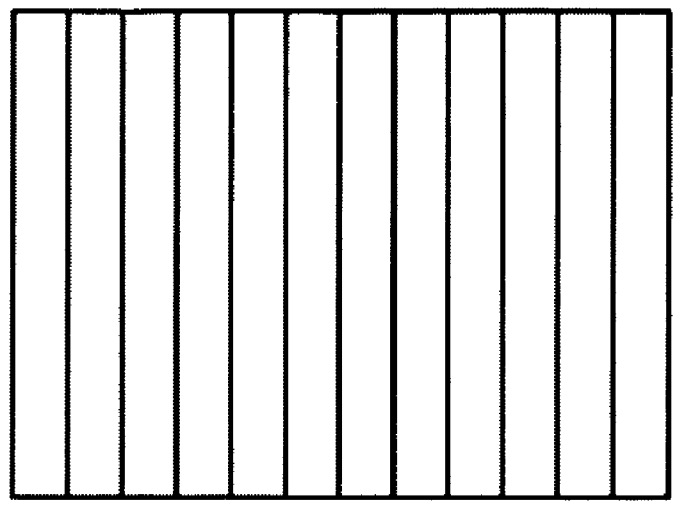
FIG. 4(c) illustrates a top down view representative of the structure illustrated in FIG. 4(a).
Figure 4D:
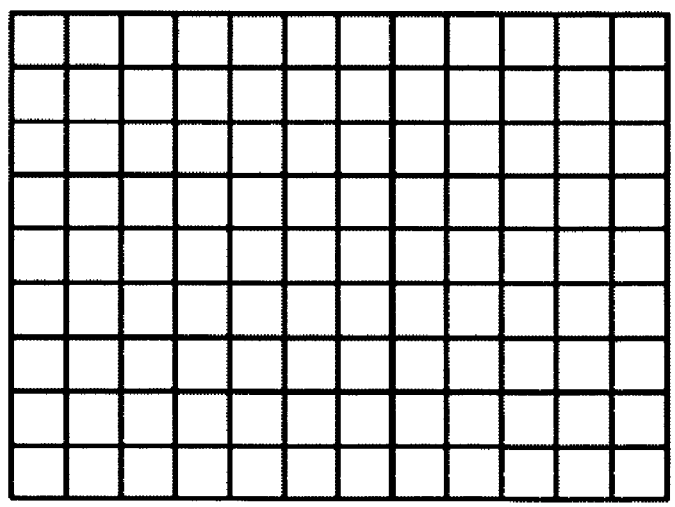
FIG. 4(d) illustrates a ton down view representative of a two-dimensional grating structure.

FIG. 4(*a*) illustrates another example beneficial multilayer dielectric structure for out-coupling ASE radiation of a laser gain media while providing high-efficiency transmission of the pump and extraction beams. As shown in FIG. 4(*a*), a laser gain media 50, such as a slab or disk with an index n_s is provided. On the surface of such a laser gain media 50 is a very thin layer 52 (e.g., less than about 200 nm in thickness) of a dielectric material of index n_f such that n_f>n_s. This supplies the condition necessary that ASE emitted at arbitrary angles inside the laser slab can be coupled out with reasonable efficiency into the grating layers while transmitting the extraction and pump light with greater than about 90% efficiency, even more often with greater than about 99.8% efficiency. Atop this layer is a grating structure 53 made of one or more dielectric materials (e.g., 54 and 56) having predetermined thicknesses. FIG. 4(*a*) thus illustrates an example grating structure example made of 2 discrete layers (e.g., 54 and 56) to illustrate the present invention but is not to be limited to just such structures. Ideally this is a two-dimensional grating structure, but it is illustrated here as a one-dimensional grating.

As detailed above in the general description section, diffraction from such a grating structure is governed by the grating equation: $\sin \theta_m = \sin \theta_i + m\lambda/d$, where $\theta_m$ is the diffracted angle, $\theta_i$ is the incident angle of the incoming beam, $\lambda$ is the extraction beam wavelength, m is the diffracted order and d is the grating period. For this application, the period d must be such that p<$\lambda$, often less than about $\lambda/2$. This assures that only m=0 transmission is allowed by the grating equation for the extraction beam entering the structure at near-normal incidence (i.e. higher order transmissions and reflections are evanescent).

The height and duty cycle (ratio of linewidth to period) of the layers that make up the grating are optimized to simultaneously satisfy the following criteria:

1. maximum transmission of incident extraction beam light into the m=0 transmitted order at near-normal incidence,
2. Maximum transmission of the pump light into the m=0, +1 and/or −1 transmitted orders at a specified angle,
3. Minimized reflection of the pump and extraction beams,
4. Maximized out-coupling of ASE light of wavelength $\lambda$ emitted in the volume of the slab, over a broad angle range.

FIG. 4(*b*) illustrates an optimized design of FIG. 4(*a*), which includes a $Ta_2O_5$ 120 nm layer 62, a $Ta_2O_5$ 390 nm thick grating layer 64, a2 $SiO_2$ 190 mm layer 66 configured on a desired laser gain media, i.e., ceramic YAG slab 60 for amplifying 1053 nm light with 808 nm diode pump light while transmitting both extraction and pump light at >99.5% efficiency. Such a grating, having 1800 lines/mm grating made from layers of all-dielectric materials $Ta_2O_5/SiO_2$, is in this example arrangement, deposited onto ceramic YAG slab 60. Such a grating, with a lamellar structure etched into both layers, is very similar to designs demonstrated for high-energy Petawatt grating applications. It demonstrates high transmission efficiency for the pump and main beam at S-polarization and small incidence angles, with more than 30% of the pump light scattered at high angles into the medium.

Figure 5:
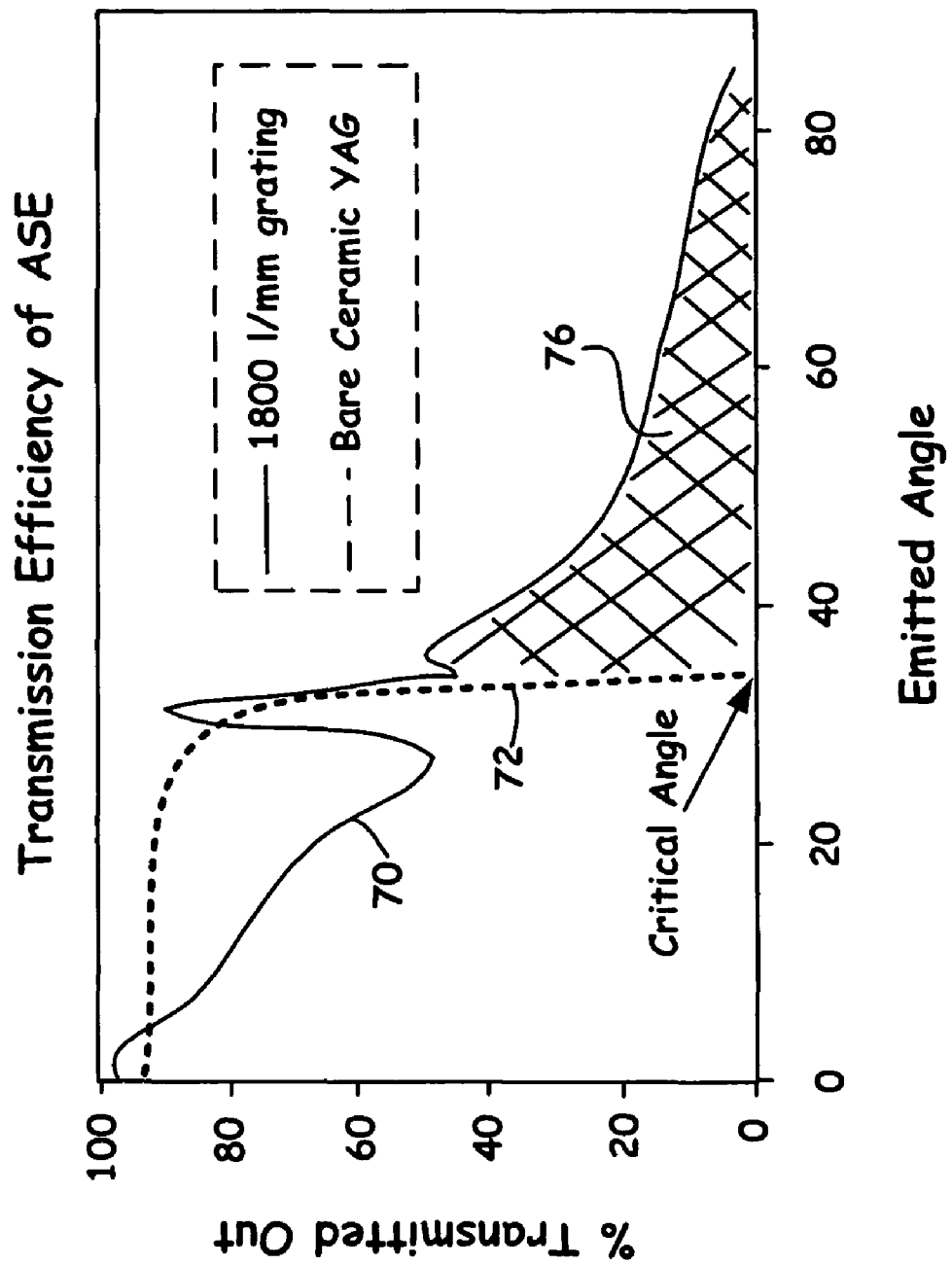
FIG. 5 compares the transmission efficiency out of a grating embodiment for ASE incident on the face from 0 to 85 degrees as opposed to a bare YAG surface.

FIG. 5 compares the transmission efficiency of a grating embodiment 70 example embodiment of FIG. 4(*b*) for ASE incident on the face from 0 to 85 degrees through such a grating arranged on a predetermined media 70 as opposed to a bare YAG surface 72. Importantly, FIG. 5 shows out-coupling for those ASE rays greater than or equal to the critical angle 76 (denoted with hashed markings) when utilizing a grating feature as disclosed herein.

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The invention claimed is:

1. A method for suppressing ASE in a high average power solid-state laser, comprising:
providing one or more laser gain media;
integrating one or more non-planar profiles with said one or more laser gain media;
efficiently extracting a desired spectral range of radiation that passes through the one or more non-planar profiles, as a result of the integrating; and
efficiently coupling a predetermined optical pump source and out-couple amplified spontaneous emission (ASE) for each said laser gain media, as a result of the integrating;
wherein said one or more non-planar profiles provide for greater than about 90% transmission for an extraction beam and for greater than about 90% optical coupling of a pump light source.

2. The method of claim 1, wherein said one or more non-planar profiles comprise a grating having a profile selected from: sinusoidal, triangular and rectangular profiles.

3. The method of claim 1, wherein said one or more non-planar profiles enable amplified spontaneous emission (ASE) of a predetermined wavelength that is equal to or greater than the critical angle for a given material at predetermined surfaces of said one or more laser gain media to be substantially out-coupled.

4. The method of claim 1, wherein said non-planar profile comprises integration to one or more face of said laser gain media.

5. The method of claim 1, wherein said non-planar profile comprises integration to one or more peripheral edges of said laser gain media.

6. The method of claim 1, wherein said laser gain media comprises at least one laser gain media selected from: neodymium gadolinium gallium garnet (Nd:GGG), neodymium doped yttrium aluminum Garnet (Nd:YAG), ytterbium doped yttrium aluminum garnet (Yb:YAG), Ti:Sapphire (Ti:$Al_2O_3$), ruby ($Cr_2O_3$), alexandrite ($BeAl_2O_4$:$Cr^{3+}$), ceramics, ytterbium-doped strontium-fluorapatite (Yb:S-FAP), Neodymium Doped Yttrium Orthvanadate (Nd:$YVO_4$), and Erbium doped Yttrium Lithium Fluoride (Er:YLF).

7. The method of claim 1, wherein said non-planar profile comprises one or more layers selected from $HfO_2$, $SiO_2$, $Ta_2O_{4-5}$, $Sc_2O_3$, $ZrO_2$, $TiO_2$, $Al_2O_3$, $MgF_2$, $CaF_2$, $ThF_4$, ZnS, ZnSe.

8. The method of claim 1, wherein a thin dielectric layer having an index of refraction less than said laser gain media is interposed between said laser gain media and said non-planar profile.

9. The method of claim 1, wherein amplified spontaneous emission (ASE) can be suppressed at high average power extractions of up to about 100 kW.

10. The method of claim 1, wherein said one or more non-planar profiles operate as a transmission grating.

11. The method of claim 1, wherein said one or more non-planar profiles operate as a reflection grating.

12. The method of claim 1, wherein said optical pump source further comprises double-sided pumping.

13. The method of claim 1, wherein said one or more non-planar profiles comprises a one-dimensional grating structure.

14. The method of claim 1, wherein said one or more non-planar profiles comprises a two-dimensional grating structure.

15. An apparatus configured for suppressing ASE while efficiently coupling pump light and transmitting a desired extraction beam, comprising:
at least one laser gain media; and
one or more non-planar profiles coupled with one or more predetermined surfaces of said at least one laser gain media so as to efficiently extract a desired spectral range of radiation that passes through the one or more non-planar profiles, as a result of the one or more non-planar profiles being coupled with one or more predetermined surfaces of said at least one laser gain media;
wherein the apparatus is configured to efficiently couple a predetermined optical pump source and out-couple amplified spontaneous emission (ASE) for each said laser gain media;
wherein the apparatus is configured such that said one or more non-planar profiles provide for greater than about 90% transmission for an extraction beam and for greater than about 90% optical coupling of a pump light source.

16. The apparatus of claim 15, wherein said non-planar profiles comprise a grating having a profile selected from: sinusoidal, triangular and rectangular profiles.

17. The apparatus of claim 16, wherein said grating comprises an etched, milled, or cut surface.

18. The apparatus of claim 16, wherein said grating comprises one or more dielectric layers.

19. The apparatus of claim 18, wherein a thin dielectric layer of less than about 200 nm and having an index of refraction less than said at least one laser gain media is interposed between said grating and said at least one laser gain media.

20. The apparatus of claim 19, wherein said thin dielectric layer and said grating dielectric layers comprise one or more layers selected from $HfO_2$, $SiO_2$, $Ta_2O_{4-5}$, $Sc_2O_3$, $ZrO_2$, $TiO_2$, $Al_2O_3$, $MgF_2$, $CaF_2$, $ThF_4$, ZnS, ZnSe.

21. The apparatus of claim 17, wherein said grating further comprises a coating selected from gold or one or more dielectric layers.

22. The apparatus of claim 16, wherein said grating further comprises a dielectric overcoat.

23. The apparatus of claim 15, wherein said one or more non-planar profiles enable amplified spontaneous emission (ASE) of a predetermined wavelength that is equal to or greater than the critical angle for a given material at predetermined surfaces of said at least one laser gain media to be substantially out-coupled.

24. The apparatus of claim 15, wherein said one or more non-planar profiles comprise integration with one or more face of said at least one laser gain media.

25. The apparatus of claim 15, wherein said one or more non-planar profiles comprise integration with one or more peripheral edges of said at least one laser gain media.

26. The apparatus of claim 15, wherein said at least one laser gain media comprises at least one laser gain media selected from: neodymium gadolinium gallium garnet (Nd:GGG), neodymium doped yttrium aluminum Garnet (Nd:YAG), ytterbium doped yttrium aluminum garnet (Yb:YAG), Ti:Sapphire (Ti:Al$_2$O$_3$), ruby (Cr$_2$O$_3$), alexandrite (BeAl$_2$O$_4$:Cr$^{3+}$), ceramics, ytterbium-doped strontium-fluorapatite (Yb:S-FAP), Neodymium Doped Yttrium Orthvanadate (Nd:YVO$_4$), and Erbium doped Yttrium Lithium Fluoride (Er:YLF).

27. The apparatus of claim 15, wherein amplified spontaneous emission (ASE) can be suppressed at high average power extractions of up to about 100 kW.

28. The apparatus of claim 15, wherein said one or more non-planar profiles operate as a transmission grating.

29. The apparatus of claim 15, wherein said one or more non-planar profiles operate as a reflection grating.

30. The apparatus of claim 15, wherein said optical pump source further comprises double-sided pumping.

31. The apparatus of claim 15, wherein said one or more non-planar profiles comprises a one-dimensional grating structure.

32. The apparatus of claim 15, wherein said one or more non-planar profiles comprises a two-dimensional grating structure.

33. The apparatus of claim 32, wherein the two-dimensional grating structure includes a cross-grating configuration.

34. The apparatus of claim 15, wherein the one or more non-planar profiles includes a first grating and a second grating, the second grating including grooves oriented perpendicular to grooves of the first grating, the first and the second grating being positioned on an opposite side of the one or more laser gain media with respect to one another.

* * * * *